United States Patent
Pappalardo et al.

(10) Patent No.: US 7,352,301 B2
(45) Date of Patent: Apr. 1, 2008

(54) METHOD FOR TRANSMITTING A DATA FLOW OVER AN OPTICAL BUS, CORRESPONDING SYSTEM AND COMPUTER PROGRAM PRODUCT

(75) Inventors: Francesco Pappalardo, Paterno (IT); Giuseppe Notarangelo, Putignano (IT); Giuseppe Visalli, Messina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 528 days.

(21) Appl. No.: 10/963,737

(22) Filed: Oct. 12, 2004

(65) Prior Publication Data
US 2005/0281562 A1  Dec. 22, 2005

(30) Foreign Application Priority Data
Oct. 13, 2003  (EP)  ................................... 03425663

(51) Int. Cl.
*H03M 5/00*  (2006.01)
(52) U.S. Cl. .............................. 341/55; 341/50; 341/51; 714/708
(58) Field of Classification Search ................. 341/50, 341/51, 55; 398/183, 173, 41; 714/809
See application file for complete search history.

(56) References Cited

U.S. PATENT DOCUMENTS

| | | | |
|---|---|---|---|
| 4,399,563 A * | 8/1983 | Greenberg | 398/41 |
| 4,682,334 A * | 7/1987 | Le Mouel et al. | 714/809 |
| 4,903,338 A * | 2/1990 | Funke | 398/173 |
| 6,169,769 B1 | 1/2001 | Kawaguchi | 375/316 |
| 6,317,247 B1 * | 11/2001 | Yang et al. | 359/245 |
| 2003/0198478 A1 * | 10/2003 | Vrazel et al. | 398/183 |

OTHER PUBLICATIONS

Benini, L. et al., "Address Bus Encoding Techniques for System-level Power Optimization," in *Proceedings of Design, Automation and Test in Europe*, Feb. 23-26, 1998, pp. 861-866.
Stan, M., et al., "Bus-Invert Coding for Low-Power I/O," IEEE Transactions on Very Large Scale Intergration (VLSI) Systems 3(1):49-58, Mar. 1995.

* cited by examiner

*Primary Examiner*—Jean B Jeanglaude
(74) *Attorney, Agent, or Firm*—Lisa K. Jorgenson; Robert Iannucci; Seed IP Law Group PLLC

(57) ABSTRACT

A method for transmitting on an optical connection an input data sequence having first and second logic states, includes encoding the input data sequence prior to transmission on the optical connection, where the encoding minimizes the first logic states in the encoded data sequence. The encoding includes: arranging the input data sequence in parallel on a number of bus lines; counting the first logic states in the input data sequence; comparing the counting result with a value equal to half of the lines; and logically inverting the input data sequence on the lines if the counting result is greater than half of the lines of the input data sequence. The method further includes: ordering values of the input data sequence; identifying the first value having the first logic state; and applying the encoding operation just to the ordered values subsequent to the first value having the first logic state.

32 Claims, 8 Drawing Sheets

METHOD FOR TRANSMITTING A DATA FLOW OVER AN OPTICAL BUS, CORRESPONDING SYSTEM AND COMPUTER PROGRAM PRODUCT

BACKGROUND OF THE INVENTION

1. Field of the Invention

The present invention relates to techniques for encoding data on buses for the purpose of reducing the power dissipated on optical buses in telecommunications systems and has been developed with particular attention paid to its possible application to on-chip integrated buses, in particular buses of medium and small dimensions.

It is, in any case, to be borne in mind that the scope of the invention is more general. The invention is, in fact, applicable to all telecommunications systems in which there occur conditions of operation of the same type as the ones described in what follows.

2. Description of the Related Art

In modern telecommunications systems, intensive use has been made of optical fibers as physical medium of the transmission channel. In fact, optical fibers ensure a high frequency of the carrier and, by virtue of the wide band associated thereto, enable multiplexing of a large number of communication channels on a single fiber.

Optical-fiber telecommunications systems are particularly simple and involve sources for modulation of the optical signal on the fiber, such as lasers or LEDs and photodetection devices, which currently are mostly made up of discrete components but which, in the future, will be integrated on-chip.

However, said systems present certain technological limits. One of said limits lies in the need to carry out electro-optical and opto-electrical conversions for enabling processing of the signal. These conversions limit the transmission bandwidth. Furthermore, the attenuation introduced by the fiber on the signal and other noise sources make demodulation at the receiver end a problem of stochastic detection.

The signals received on an electrical bus are multiplexed on an optical fiber, by serializing the signal of the electrical bus and sending it over the individual optical fiber via modulation of an on-off-keying (OOK) type of the source.

FIG. 1 represents a system for transmission on a synchronous optical bus.

The system in question comprises a transmitter, designated as a whole by the reference 10, in which there is present a serializer device designated by 12, which receives from an electrical bus 11 the input signal, carries out a parallel-to-serial conversion thereon and supplies it to a driving device represented by the block 14 and designed to drive a laser diode 15 so as to cause it to emit on an optical fiber 16, which embodies the so-called optical bus. At the other end of the optical fiber 16 is a receiver 20, comprising a photodetector 21, for opto-electrical conversion of the received optical signal, followed by an amplifier 22 and a comparator 23, downstream of which is set a serial-to-parallel converter 24 that supplies the electric output signal.

From the serializer device 12 a clock signal CK is further obtained, which is transmitted by a laser diode 15', driven by a corresponding driving device 14', on an optical fiber 16', is received at the receiver 20 by a photodetector 21', followed by an amplifier 22' and a comparator 23', and is supplied to the serial-to-parallel converter 24, so as to drive correctly the operation of conversion.

In fact, since the data on the electrical bus 11 are transmitted on an integer number n of lines, in the parallel-to-serial conversion these data are converted to a frequency n times the frequency of the clock signal associated with the electrical bus 11. Hence, the clock signal CK is transmitted on the optical fiber 16' in order to enable recovery of the data in reception and to solve problems of synchronization in detection.

The modulation adopted for the laser diode 15 is, as has been said, of the OOK type.

FIG. 2 shows the optical power $P_0(t)$ incident on the photodetector 21 as a function of time t, whilst FIG. 3 shows the current I(t) in the photodetector 21 as a function of time (t). The logic levels of the input signal are zero and one.

The modulated optical signal $P_0(t)$ is:

$$P_0(t) = P_M \cdot \sum_k b_k \cdot p(t - kT) \quad (1)$$

where $P_M$ indicates the power emitted by the laser source, $b_k$ a binary coefficient and p(t) the envelope of the signal. Hence, it is clearly a base-band pulse-amplitude modulation (PAM), where the elementary impulse response is a rectangular impulse.

BRIEF SUMMARY OF THE INVENTION

One embodiment of the present invention provides a solution that enables a reduction of power consumption in an optical-fiber telecommunications system.

One embodiment of the present invention is directed to a method having the characteristics recalled specifically in the claims that follow. The invention also regards the corresponding telecommunications system, as well as the corresponding computer-program product directly loadable into the memory of a computer such as a processor and comprising software code portions for performing the method according to the invention when the product is run on a computer.

One embodiment of the invention provides for applying to the optical bus a technique of inversion applied to a set of bits of the bus which is reduced in a variable way datum by datum.

As compared to known solutions, the embodiment reduces power consumption of the optical sources.

A preferential application is to optical-fiber communication systems with on-chip integrated buses.

BRIEF DESCRIPTION OF THE SEVERAL VIEWS OF THE DRAWINGS

The invention will now be described, purely by way of non-limiting example, with reference to the annexed drawings, in which.

DETAILED DESCRIPTION OF THE INVENTION

It is evident that the power consumption of a laser source is linked to the number of logic ones in the sequence of symbols to be transmitted. There is hence a desire for an encoding pre-stage for reducing the number of logic ones to be transmitted on the fiber.

Solutions are known for reducing the switching activity on electrical buses.

One procedure is a procedure referred to as bus-inverted technique.

Said bus-inverted procedure envisages that, if b(t) is a sequence of non-encoded input signals and B(t) is the encoded sequence of data at output from an appropriate encoder, this encoder operates according to the relation:

$$[B(t), INV] = \begin{cases} b(t), 0 & H[b(t) \oplus B(t-1)] \leq n/2 \\ \overline{b_c(t)}, 1 & \text{otherwise} \end{cases} \quad (2)$$

where: H is the Hamming function used for counting the transitions that occur in passing from B(t−1) to B(t); INV is an inversion signal transmitted on an additional line, which informs the receiver whether the data are encoded or otherwise; and $\overline{b_c(t)}$ is the sequence of input data which has undergone complete inversion by inversion of each of the bits composing it.

The bus-inverted procedure hence measures a number of switchings, i.e., the switching activity SA, which should be obtained if the data were transmitted non-encoded. If said switching activity SA is less than n/2, the non-encoded sequence of input data b(t) is transmitted, otherwise its inverted value is transmitted. This technique guarantees at every instant a switching activity SA of less than n/2.

Disclosed in U.S. patent application Ser. No. 10/830,490, filed on Apr. 21, 2004, and assigned to STMicroelectronics Srl, the assignee of the present application, is a system that implements the bus-inverted procedure on an optical bus, so resulting in an optical bus-inverted procedure, in which the encoded sequence of data B(t) is defined as follows:

$$[B(t), INV] = \frac{b(t), 0}{\overline{b_c(t)}, 1} \quad \begin{array}{l} Z[b(t) \leq n/2] \\ \text{otherwise} \end{array} \quad (3)$$

where Z is a function of counting of logic ones applied to the sequence of input data b(t), and $\overline{b_c(t)}$ is the sequence of input data which has undergone complete inversion by inversion of each of the bits that make it up.

Figure 4:
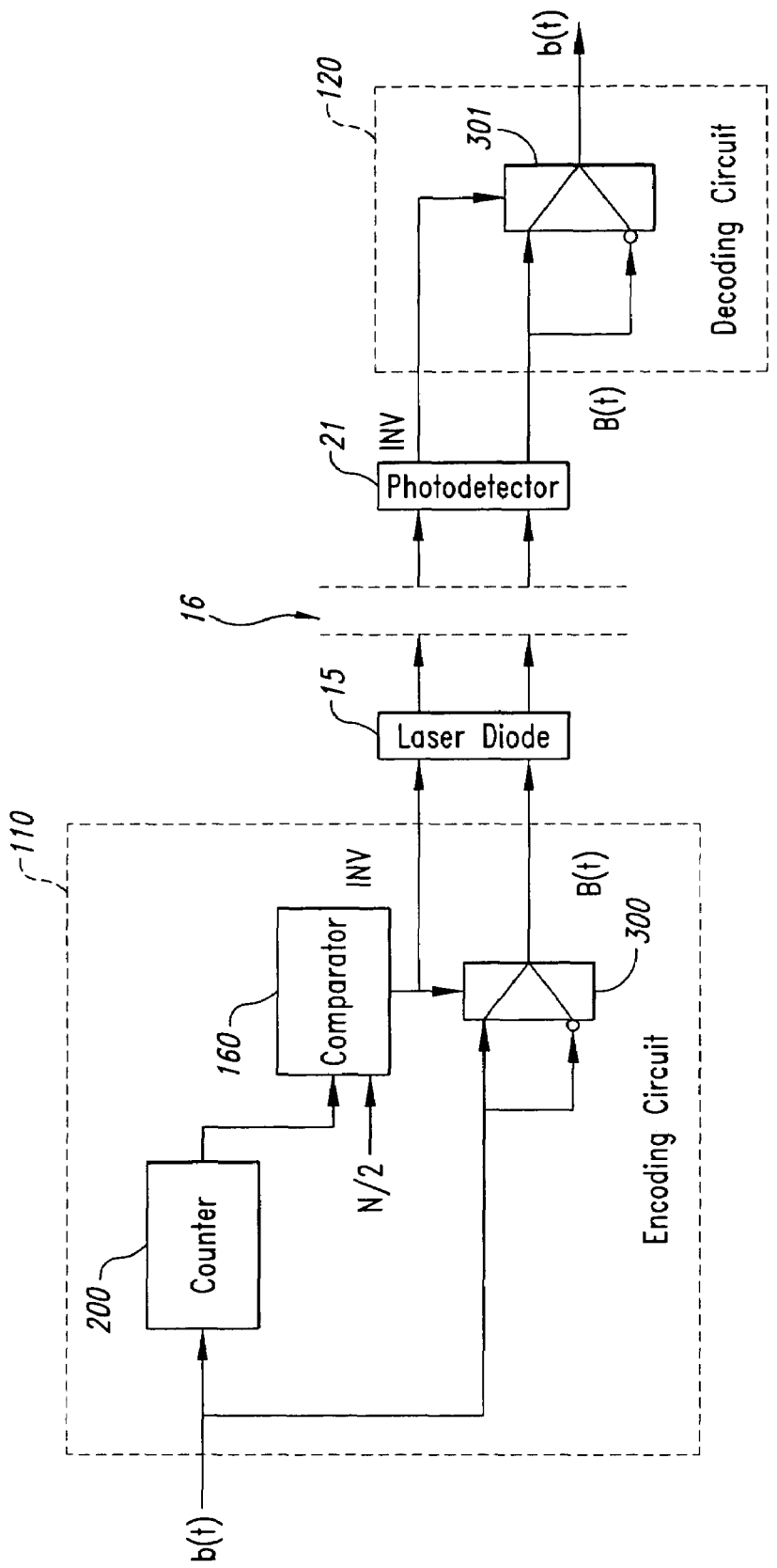
FIG. 4 is a block diagram of one system for implementing a bus inversion system.

FIG. 4 shows an encoding circuit 110 for implementing said optical bus-inverted procedure.

The non-encoded sequence of input data b(t) is sent to a block designated by the reference 200, which executes the counting function. The output from the block 200 is sent to one of the inputs of a binary comparator 160, to the other input of which there is sent the value n/2. The comparator 160 is thus designed to generate the inversion signal INV.

The inversion signal INV is sent on the channel consisting of the optical fiber 16, after prior electro-optical conversion by means of the laser diode 15 or a similar device. The inversion signal INV is also sent as selection signal to a multiplexer 300, which receives at its two inputs the sequence of input data b(t) and its negated version. The multiplexer 300 supplies at output the encoded sequence of data B(t). Hence, via the block 200, the ones present in the sequence of input data b(t) are counted, by implementing the function Z for counting the ones, the purpose being to compare the value obtained with the value n/2 according to the relation (3).

Provided in the receiver is a decoding circuit 120, preceded by a photodetector 21, said decoding circuit comprising a further multiplexer 301, which receives at its inputs the encoded sequence of data B(t) and its negated version. The multiplexer 301 supplies at output the correct sequence of input data b(t), decoded under the control of the inversion signal INV.

The system illustrated with reference to FIG. 4 takes into account the fact that, in the optical bus, the power dissipated is not due to the variation of the value of the bit, but only to the absolute value transmitted.

However, in the case of encoding, the optical bus-inverted procedure described above, defined by the function of choice according to relation (3), inverts all the bits and hence also the correct ones.

A method according to one embodiment of the invention for transmitting a flow of input data on an optical bus basically provides for reducing the set of bits of the bus on which the method of inversion of the optical bus is applied, excluding the bits that have not been changed, and hence are be inverted, starting, in particular, from the bit that statistically changes least. Said operations are executed in a variable way, datum by datum. In particular, there is envisaged the use of a data bit for marking the borderline between the bits to which the method of inversion of the optical bus is applied and the bits to which, instead, said method is not applied.

Figure 1:
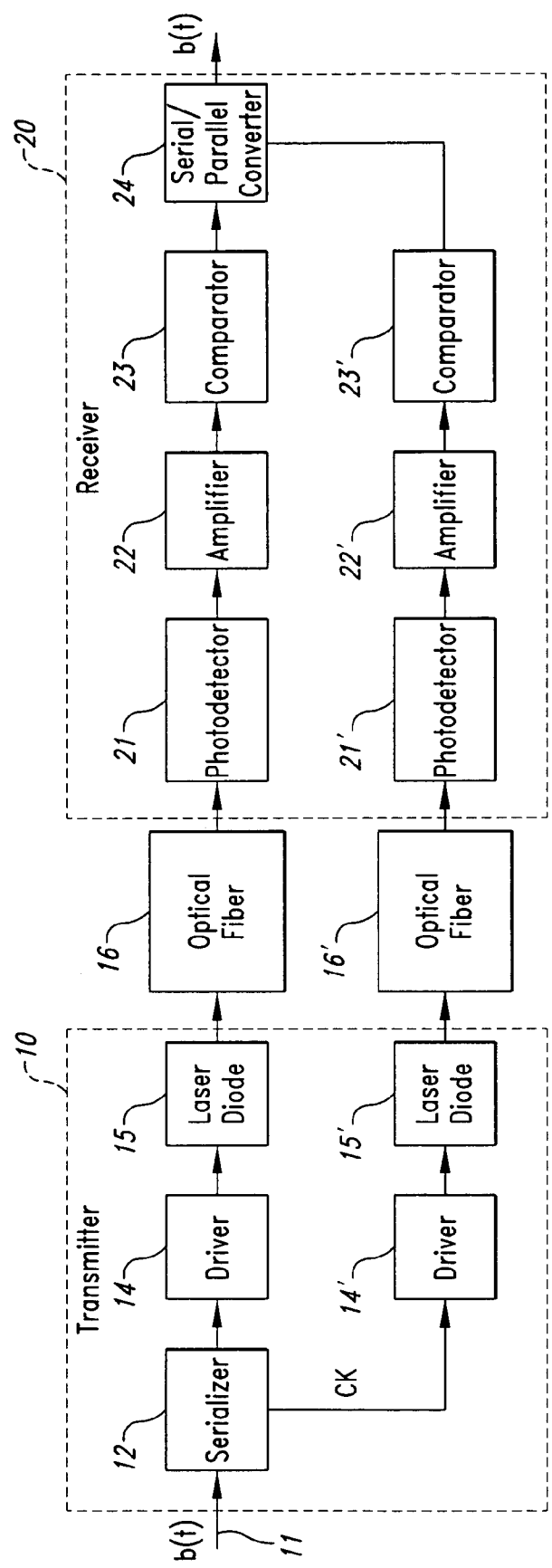
FIGS. 1, 2, and 3, which in themselves correspond to the known art, have already been described previously.
Figure 2:
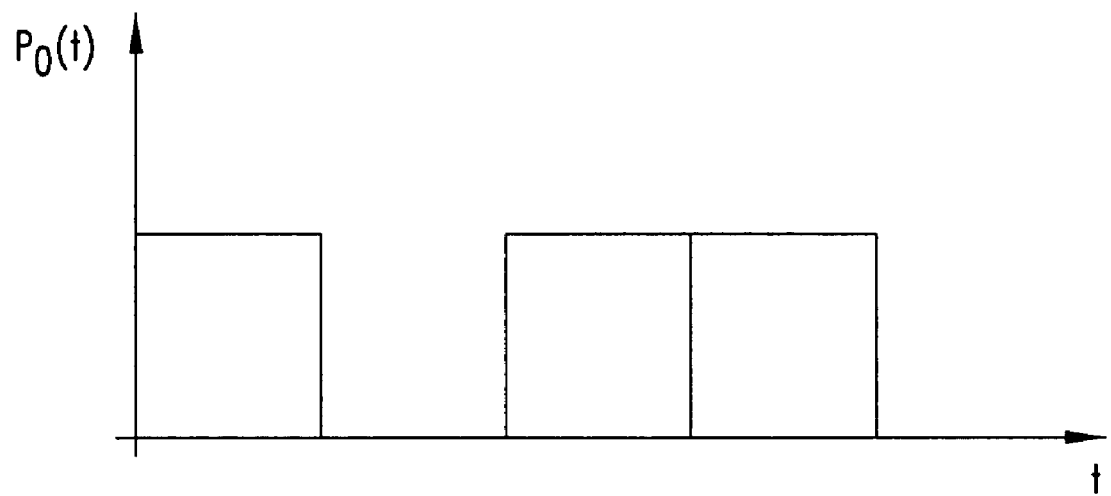
Figure 3:
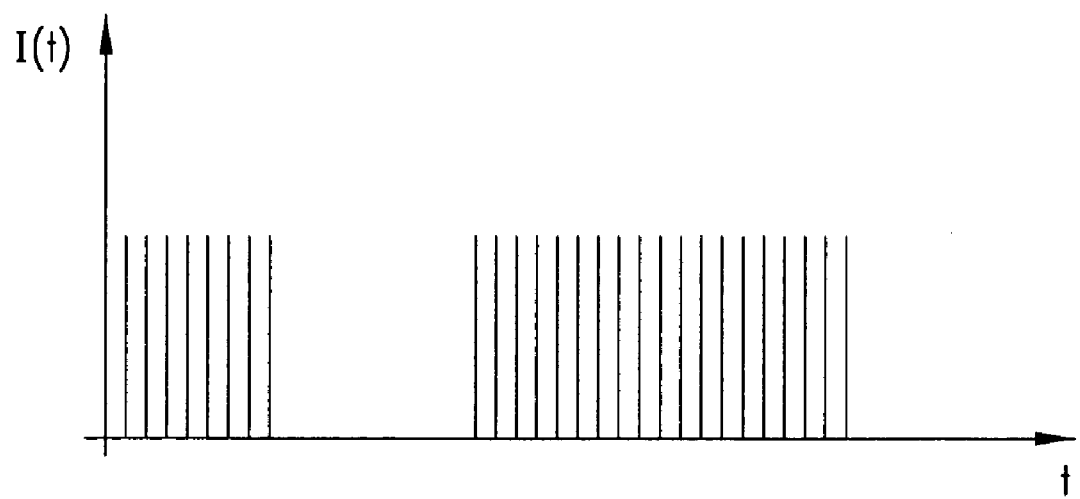

According to the method proposed, b(t) indicates the sequence of input data desired to be sent at time t on the optical bus, and B(t) indicates the sequence of output encoded data actually transmitted on the optical bus 16, in a way similar to what has been said with reference to FIG. 1. The sequence of input data b(t) is made up of n bits corresponding to the n bus lines, namely, $b_{n-1}(t)$, $b_{n-2}(t)$, ..., $b_1(t)$, $b_0(t)$, ordered from the most significant bit to the least significant bit. The optical bus 16 is understood as being designed to carry n+1 bits, i.e., is understood as having n+1 lines, including the line for the inversion signal INV.

Figure 5:
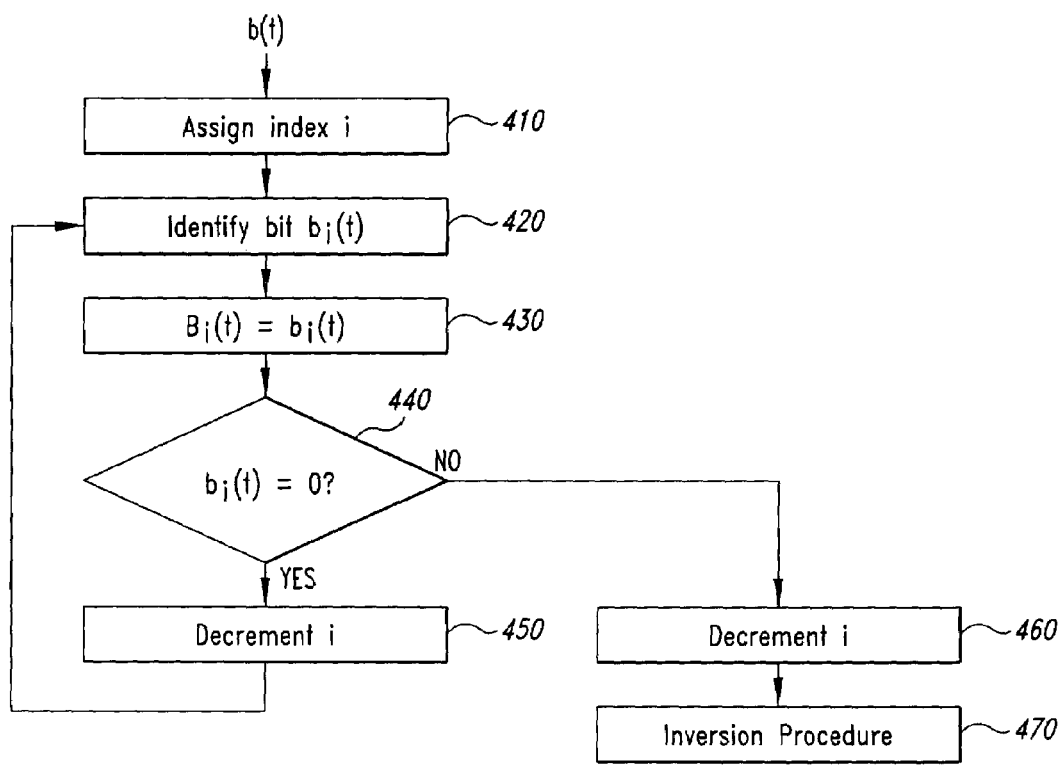
FIG. 5 shows a flowchart corresponding to the method according to the invention.

The method proposed comprises the following operations, which are described with reference to the diagram of FIG. 5, where:

the block designated by the reference 410 indicates an operation of assignment of the index i of the bits $b_i(t)$ of the input sequence datum b(t) to be processed, which provides for starting to operate from the most significant bit of the input sequence b(t); hence, initially assigned to the index i is the value n−1, and the bit $b_{n-1}(t)$ is considered;

the bit $b_i(t)$ thus chosen is passed on to a block 430 where it is set equal to the bit $B_i(t)$ of the encoded sequence B(t); in other words, the bit $b_i(t)$ is sent non-encoded on the bus 16;

next, the bit $b_i(t)$ is passed on to a decision block 440, where it is verified whether said bit $b_i(t)$ is equal to the value 0;

in the positive, control is transferred to a block 450, in which the index i of the bits of the sequence of input data b(t) is decremented, and the next bit $b_i(t)$ is considered, always in the order from the most significant bit to the least significant bit; the new bit $b_i(t)$ thus selected is entered, via a mixing node 420, at input to block 430;

in the negative, i.e., in the case where in the decision block 440 the selected bit $b_i(t)$ is found to be equal to the value 1, said i-th bit of the non-encoded sequence of input data b(t) is selected as marker bit M; the index i is then decremented in a block 460 altogether similar to the block 450, and the new selected bit $b_i(t)$ is sent to a block 470, where the optical bus-inverted procedure is carried out on the remaining bits subsequent to the marker bit M of value 1.

Using the proposed method it is advantageously possible to obtain a reduction in the power dissipated, in so far as it is possible to transmit a greater number of zeroes than with the non-encoded datum, i.e., the input sequence b(t).

Said advantage can be verified both analytically and via measurements carried out on simulations.

Analytically, the power reduction can be calculated applying the relations that will be described in what follows.

If $P_{OBI}$ is the consumed power associated to the optical bus-inverted procedure according to relation (3), and it is taken into account that the data at time t in the sequence of input data b(t) is encoded if the number of logic ones is greater than n/2, we have:

$$P_{OBI} = \sum_{i=0}^{n-1} \overline{b}_i = \sum_{i=M}^{n-1} \overline{b}_i + \sum_{i=0}^{M-1} \overline{b}_i = (n-1-M) + \sum_{i=0}^{M-1} \overline{b}_i \quad (4)$$

where $\overline{b}_i$ is the i-th inverted bit of the non-encoded sequence of input data b(t) and hence corresponds to the i-th bit of the encoded sequence B(t), and M is the marker, i.e., the position, starting from the least significant bit, of the first bit equal to 1 in the non-encoded sequence of input data b(t).

For example, if the non-encoded sequence of input data b(t) is (0 0 1 0 0 1 1 0), then the marker M assumes the value 5, i.e., (xxMxxxxx).

If $P_V$ is the consumed power associated with the proposed method for transmitting a flow of input data on an optical bus, where the data of the non-encoded sequence of input data b(t) are encoded if the number of ones in the bits from $b_{M-1}$ to $b_0$ is greater than M/2, we have:

$$P_V = \sum_{i=0}^{n-1} \overline{b}_i^{vp} = \sum_{i=M}^{n-1} b_i + \sum_{i=0}^{M-1} \overline{b}_i = 1 + \sum_{i=0}^{M-1} \overline{b}_i \quad (5)$$

where $\overline{b}_i^{vp}$ are the values to be transmitted after logical inversion of the bits subsequent to the marker M, i.e., the data of the encoded sequence B(t).

Note that, according to the method proposed, for values of the marker M different from (n−1) we always have a consumed power $P_V$ smaller than or equal to the consumed power $P_{OBI}$ associated with just the optical bus-inverted procedure, whilst for the value of the marker M equal to (n−1) the consumed power $P_V$ is greater by 1 than the power $P_{OBI}$ associated to the known optical bus-inverted procedure. This particular case, M=(n−1), occurs only when the most significant bit of the non-encoded sequence of input data b(t) is 1.

It should, in any case, be taken into account that the cases in which the method proposed can be applied are greater in number than the ones in which the bus-inverted procedure can be applied.

The method for transmitting a flow of input data on an optical bus proposed and illustrated with reference to FIG. 5 can be improved, in particular with respect to the case where the marker M is n−1, by introducing a three-level splitting procedure in the transmission of the bit that constitutes the inversion signal INV. The cases where M is smaller than n−1 are distinguished from those where M is equal to n−1: the optical bus-inverted procedure is applied in the first case, and the method proposed is applied in the second case.

Since, to make said distinction it is necessary to transmit to the decoder a further item of information corresponding to the value of the marker M, for said purpose there is used, as mentioned, an inversion signal INV with three levels, i.e., 0, C1, C2. The level C1 corresponds to transmission of a particular frequency or color by the optical bus 16 dedicated to the inversion bit INV, whilst the level C2 corresponds to the transmission of another particular frequency or color.

The bit of the inversion signal INV is encoded in an optimal way by attributing the level 0 to the condition of non-inversion, the level C1 to the inversion in the case of optical variable bus-inverted procedure according to the method proposed, and the level C2 in the case of optical bus-inverted procedure, i.e., in the case of inversion of the entire non-encoded sequence of input data b(t) associated to the occurrence of the value n−1. It is clear that the inversion of the entire non-encoded sequence of input data b(t), i.e., its encoding, will be carried out only in the case where the encoded sequence B(t) transmitted on the bus has associated a consumed power smaller than its non-encoded value.

In summary, the variant to the method proposed comprises the following operations, which are illustrated with reference to the flowchart of FIG. 6, where blocks with the same reference numbers execute the same operations as the blocks already illustrated with reference to FIG. 5:

the block designated by the reference 410 indicates an operation of assigning the index i of the bits $b_i(t)$ of the input sequence b(t) to be processed, which envisages starting to operate from the most significant bit of the input sequence b(t); hence, to the index i there is initially assigned the value n−1, and the bit $b_{n-1}(t)$ is considered;

the bit $b_i(t)$ thus chosen is passed on to a decision block 510, where it is verified whether said bit $b_i(t)$ is equal to the value 0;

in the positive, in a block 515 an operation of setting a flag bit F to the value 0 is carried out; then the bit $b_i(t)$ is passed to a block 430, where it is set equal to the bit $B_i(t)$ of the encoded sequence B(t); in other words, the bit $b_i(t)$ is sent without encoding on the bus 16;

next, the bit $b_i(t)$ is passed on to the blocks 440, 450 and 420, already described in detail with reference to FIG. 5, where there are performed the operations for identifying the marker bit M and applying the optical bus-inverted procedure to the subsequent bits of the sequence b(t) in a block 570;

in the case of output NO from block 510, in a block 520 there is executed an operation of setting of a flag bit F to the value 0; then the control is transferred, via a node 530, to a block 570; this block 570 executes the optical bus-inverted procedure, but also generates the inversion signal INV according to the following criteria:

if the flag bit F is 0, then the inversion signal INV corresponds to the level C1; and if the flag bit F is 1, then the inversion signal INV corresponds to the level C2.

Figure 6:
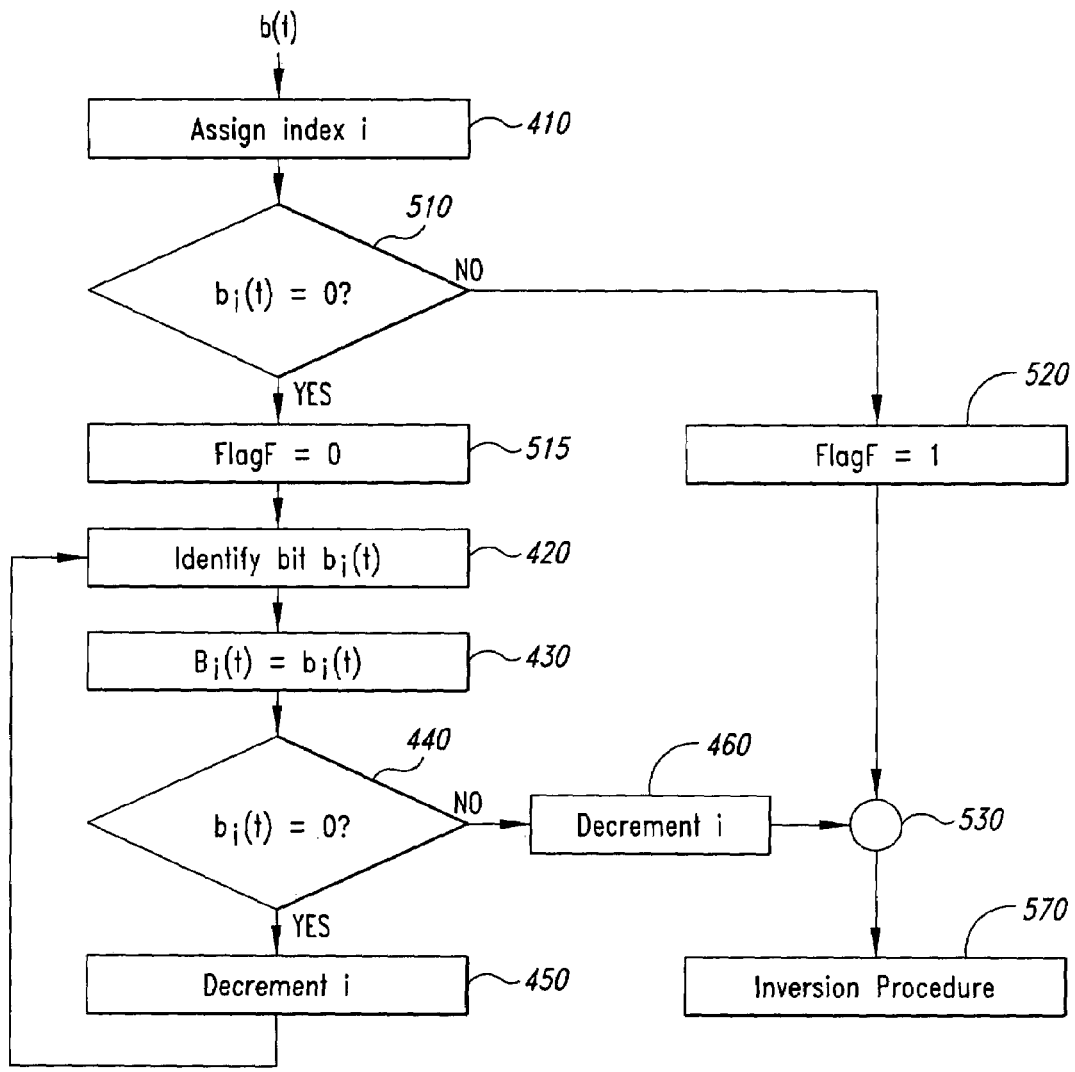
FIG. 6 shows a flowchart corresponding to a variant of the method according to the invention.

The variant of the method proposed described with reference to FIG. 6 presents all the advantages of the embodiment described with reference to FIG. 5, as well as the further advantage that, in the particular case of the value of the marker M being equal to n−1, also the power consumed corresponding to the most significant bit is recovered, since, in this case, encoding is carried out according to the optical bus-inverted procedure.

Figure 7:
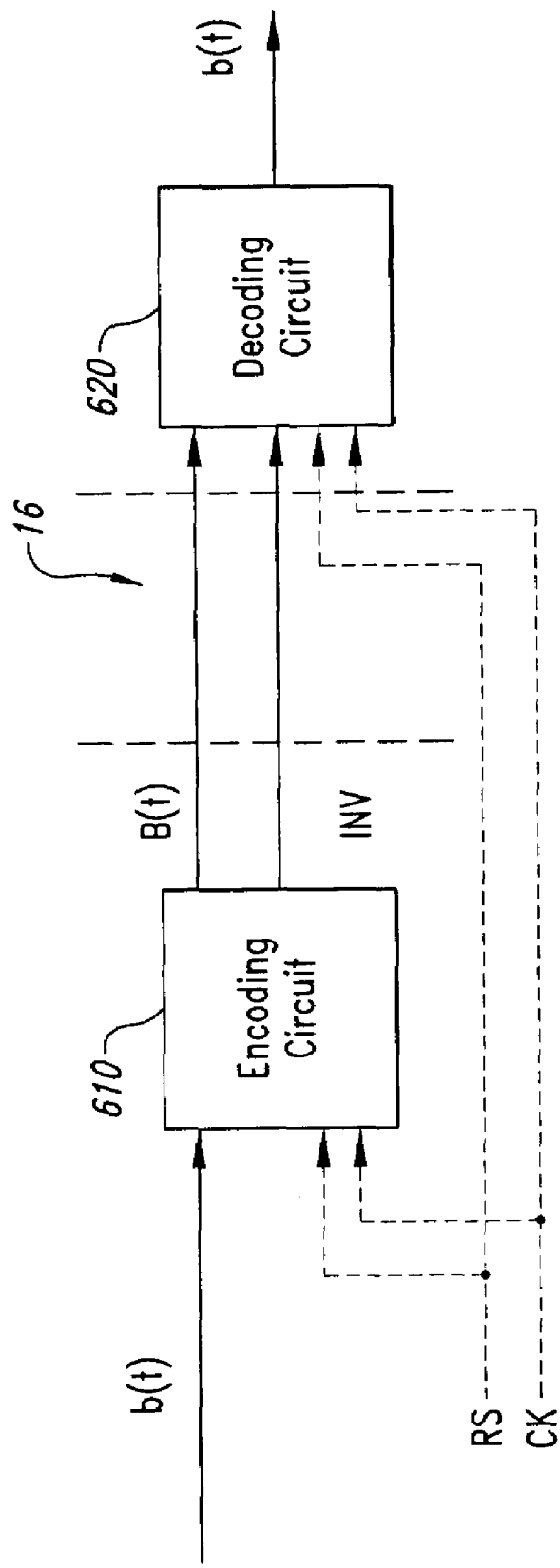
FIG. 7 is a schematic illustration of a telecommunications system implementing the method of FIG. 5.

FIG. 7 shows a block diagram representing an encoding circuit 610 and a decoding circuit 620 designed to implement the method described with reference to FIGS. 5 and 6.

The encoding circuit 610 receives at input the non-encoded sequence of input data b(t), the clock signal CK, and a reset signal RS, and supplies at output the encoded sequence B(t) and the inversion signal INV, which are transmitted on the optical bus 16 and reach the decoding circuit 620, which is designed to carry out decoding of the encoded sequence B(t) and supply the non-encoded sequence b(t). On said optical bus 16 there are also sent the clock signal CK and the reset signal RS to the decoding circuit 620.

Figure 8:
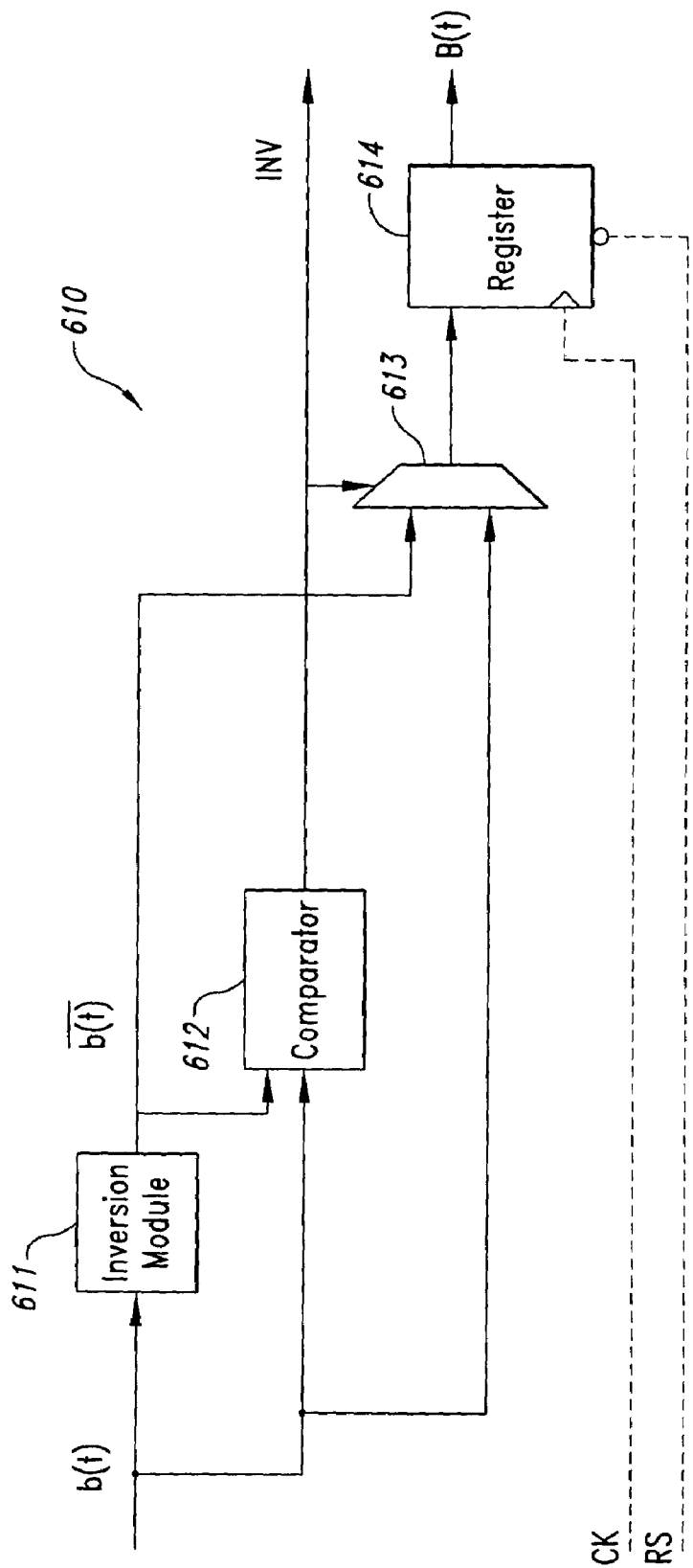
FIG. 8 illustrates a circuit detail of the telecommunications system of FIG. 5.

For a better understanding of the operation, FIG. 8 illustrates a block diagram that shows in detail the encoding circuit 610. The non-encoded sequence of input data b(t) is sent at input to a block 611, which represents an inversion module and supplies at output an inverted sequence $\overline{b}(t)$, i.e., a sequence in which the bits subsequent to the marker bit M are inverted.

The sequence of input data b(t) is sent in parallel to a comparison block 612. If the number of ones of the sequence b(t) after the marker M is greater than M/2, then the comparison block 612 generates at output an inversion signal INV with value one. Otherwise, this inversion signal INV is zero.

Alternatively, the comparison block 612 can generate at output an inversion signal INV with value one whenever the number of ones in the sequence b(t) is greater than the number of ones of the inverted sequence $\overline{b}(t)$. Otherwise, said inversion signal INV is zero.

The inverted sequence $\overline{b}(t)$ at output from block 611 and the non-encoded sequence b(t) are moreover sent at input to a multiplexer 613, the selection signal of which is provided by the inversion signal INV. If the number of ones is smaller than M/2, the inversion signal INV is 0, and at output from the multiplexer 613 there is the non-encoded sequence of input data b(t), whilst, if the number of ones is greater than M/2, the inversion signal INV is 1, and at output from the multiplexer 613 there is the inverted sequence $\overline{b}(t)$.

The output of the multiplexer 613 is then sent to a register 614, controlled by the clock signal CK and by the reset signal RS, which supplies at output the encoded sequence B(t), timed according to the clock signal CK.

Figure 9:
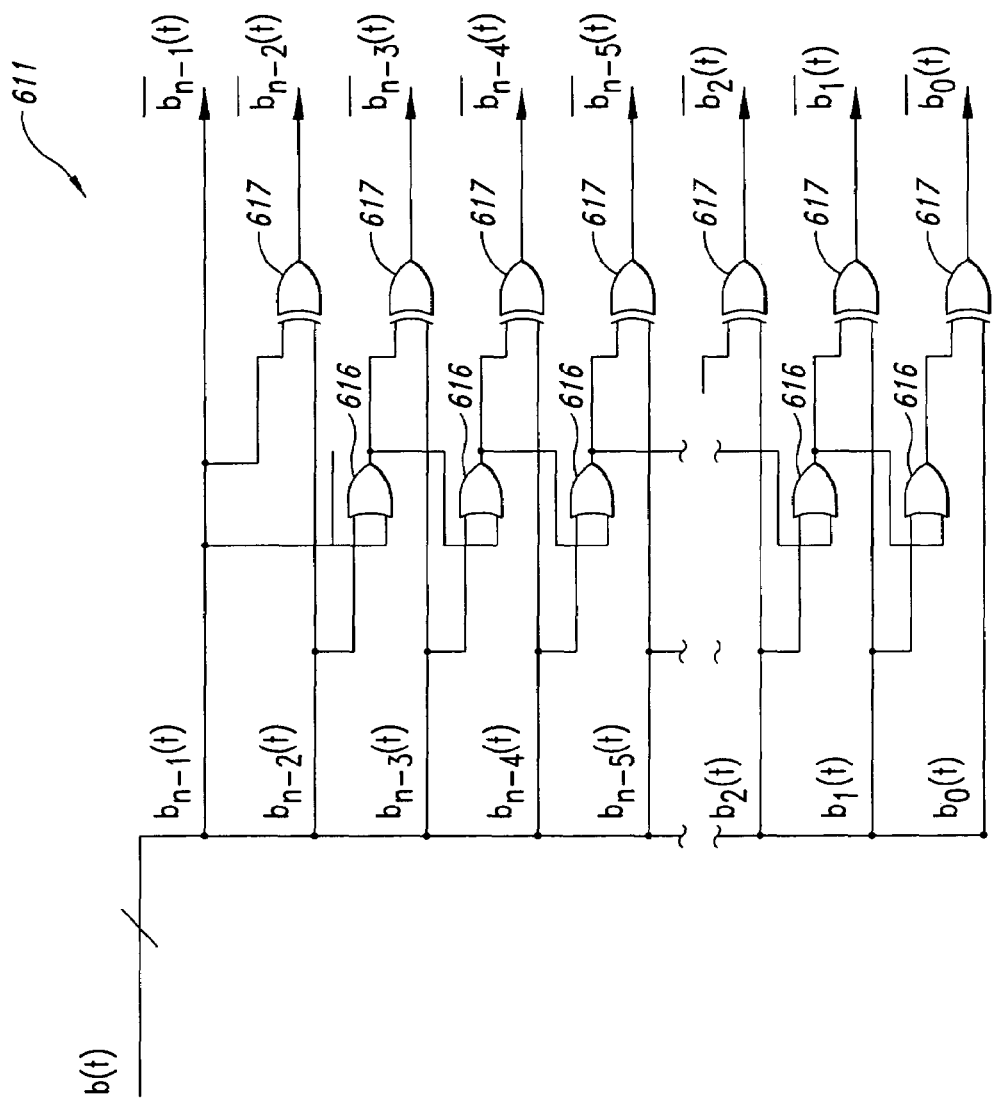
FIG. 9 illustrates a further circuit detail of the telecommunications system of FIG. 7.

FIG. 9 illustrates in detail the inversion circuit 611, which receives at input the n bits $b_i(t)$ of the sequence of input data b(t). As may be seen from said Figure, the most significant bit $b_{n-1}(t)$ is sent in any case to the output of the circuit 611. The most significant bit $b_{n-1}(t)$ is likewise sent at input to a XOR gate 617, which receives on its other input the next most significant bit $b_{n-2}(t)$. In this way, if the most significant bit $b_{n-1}(t)$ is 1 and hence is the marker bit M, the value of the next most significant bit $b_{n-2}(t)$ is in any case inverted at the output of the XOR gate 617, thus constituting the inverted bit $\overline{b}_{n-2}(t)$ of the inverted sequence $\overline{b}(t)$.

The bits $b_{n-1}(t)$ and $b_{n-2}(t)$ are sent in parallel at input to an OR logic gate 616, and the output of said OR logic gate 616 is used as input for a further XOR logic gate 617, which executes the XOR logic operation with the bit $b_{n-3}(t)$. In this case, if the bit $b_{n-1}(t)$ or the $b_{n-2}(t)$ assumes the value 1 of the marker M, the XOR gate 617 inverts the value of the bit $b_{n-3}(t)$, thus constituting the inverted bit $\overline{b}_{n-3}(t)$ of the inverted sequence $\overline{b}(t)$. This logic structure, comprising the XOR gate 617 and the OR gate 616, is repeated for all of the bits composing the sequence of input data b(t). The effect of this logic structure is that the first bit of the non-encoded sequence of input data b(t) which assumes the value 1, in this way becoming the marker bit M, brings about inversion of all the subsequent less significant bits.

The solution just described enables considerable advantages to be achieved as compared to known solutions.

As has been shown above, the method proposed for transmitting a flow of input data on an optical bus of a telecommunications system reduces the power dissipated, in so far as it is possible to transmit a greater number of zeroes as compared to the case of non-encoded data, via identification of the marker bit.

The method proposed for transmitting a flow of input data on an optical bus of a telecommunications system can advantageously be applied also to the case of serial transmission for minimizing the number of ones.

Of course, without prejudice the principle of the invention, the details of construction and the embodiments may vary widely with respect to what is described and illustrated herein, without thereby departing from the scope of the present invention, as defined in the annexed claims.

The method proposed can advantageously be applied by starting the operation of identification of the marker from the least significant bit, instead of from the most significant bit. Likewise, it is possible to start both from the least significant bit and from the most significant bit and proceed towards the bits within the datum. It is moreover clear that the method proposed can be applied starting from any other bit, for example from the central bit, and proceeding to the left or to the right, or else again in both directions.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method for transmitting on an optical connection a sequence of input data having first and second logic states, said method comprising:

providing an optical source for generating an optical signal to be transmitted on said optical connection, said optical source being able to generate optical pulses at the occurrence of said first logic states;

encoding said sequence of input data in an encoded sequence of data prior to transmission on said optical connection, where said encoding operation minimizes the first logic states in said encoded sequence of data;

driving said optical source with said encoded sequence of data in which the number of first logic states has been minimized, said encoding operation including:
arranging said sequence of input data in parallel format on a number of lines;
counting the first logic states in said sequence of input data on said number of lines in unit time;
comparing a result of said counting with a value that is proportional to the number of lines; and logically inverting said sequence of input data on said number of lines if the result of said counting is greater than said value that is proportional to the number of said bus lines of the sequence of input data;

ordering values that are assumed on said number of lines by said sequence of input data;

identifying, among said ordered values, a first value which assumes the first logic state; and applying said encoding operation only to the ordered values subsequent to said first value which assumes the first logic state.

2. The method according to claim 1, further comprising generating an additional signal to be sent on said optical connection, said additional signal indicating that a corresponding portion of the sequence of input data has been subjected to said encoding operation, if the result of the counting operation is greater than the value proportional to the number of bus lines of the sequence of input data.

3. The method according to claim 1, further comprising generating an additional signal to be sent on said optical connection, said additional signal indicating that a corresponding portion of the sequence of input data has been subjected to said encoding operation, if the result of the counting operation on the sequence of input data b(t) is greater than a result of said counting operation applied to the inverted sequence of input data.

4. The method according to claim 1, wherein said operation of ordering is executed by ordering the values assumed on said number of lines by said sequence of input data in an order starting from a most significant value.

5. The method according to claim 4, wherein said most significant value is sent non-encoded on the optical connection.

6. The method according to claim 1, further comprising assigning to an additional signal to be sent on said optical connection different logic levels according to the value identified as the first value that assumes the first logic state.

7. The method according to claim 6, wherein, if a most significant value is identified as the first value that assumes the first logic state, a level corresponding to the additional signal is assigned.

8. The method according to claim 1, further comprising:
providing said sequence of input data in a parallel format;
converting said sequence of input data from the parallel format to a serial format; and
driving said optical source using said sequence of data converted to said serial format.

9. The method according to claim 1, further comprising:
transmitting said optical signal on said optical connection;
receiving said optical signal transmitted on said optical connection in order to produce a received sequence of data; and
decoding said received sequence of data by decoding complementary to said encoding operation.

10. The method according to claim 1, wherein said first logic states are logic ones associated with a transmission of optical power on the optical connection.

11. The method according to claim 1, wherein said value proportional to the number of bus lines is equal to the half of the bus lines corresponding to said ordered values subsequent to said first value which assumes the first logic state.

12. A system for transmitting on an optical connection a sequence of data having first and second logic states, the system comprising:
an optical source for generating an optical signal to be transmitted on said optical connection, said optical source being configured to generate optical pulses at the occurrence of said first logic states;
an encoding module for encoding said sequence of input data in an encoded sequence of data prior to transmission on said optical connection, said encoding module being configured for minimizing the first logic states in said encoded sequence of data, said encoding module being configured for:
arranging said sequence of input data in parallel format on a number of bus lines;
counting said first logic states in said sequence of input data set on the number of bus lines;
comparing a result of said counting with a value that is half of the number of said bus lines;
logically inverting said sequence of input data set on the number of bus lines if the result of said counting is greater than the value representing half of the lines of the sequence of input data;
ordering the values that are assumed on the lines by said sequence of input data;
identifying, among said ordered values, a first value which assumes the first logic state; and
applying said encoding operation just to the ordered values subsequent to said first value which assumes the first logic state.

13. The system according to claim 12, wherein said encoding module is configured for generating an additional signal, which indicates that a corresponding portion of the sequence of input data has been subjected to said encoding operation, if the result of the counting operation is greater than the value representing half of the bus lines of the sequence of input data.

14. The system according to claim 12, wherein said encoding module is configured for generating an additional signal, which indicates that a corresponding portion of the sequence of input data has been subjected to said encoding operation, if the result of the counting operation on the sequence of input data b(t) is greater than a result of said counting operation applied to the inverted sequence of input data.

15. The system according to claim 12, further comprising a module for applying said encoding operation only to the ordered values subsequent to said first value which assumes the first logic state and for producing an inverted sequence.

16. The system according to claim 15, further comprising selection means for selecting the encoded sequence between said inverted sequence and the sequence of input data (b(t)) under the control of said additional signal.

17. A computer-readable medium having contents that cause a computing device to produce an output data set from an input set of data bits, by performing a method comprising:
searching the input set for a marker bit that is the first data bit of the input set having a first logic level;
outputting, in unencoded form, any data bits of the input set previous to the marker bit;
inverting any data bits of the input set subsequent to the marker bit if inverting the subsequent data bits of the input set would produce more data bits of a second logic level than data bits of the first logic level; and
outputting the subsequent data bits in unencoded form if inverting the subsequent data bits would produce more bits of the first logic level than bits of the second logic level.

18. A method of producing an output data set from an input set of data bits, the method comprising:

searching the input set for a marker bit that is the first data bit of the input set having a first logic level;

outputting, in unencoded form, any data bits of the input set previous to the marker bit;

inverting any data bits of the input set subsequent to the marker bit if inverting the subsequent data bits of the input set would produce more data bits of a second logic level than data bits of the first logic level; and outputting the subsequent data bits in unencoded form if inverting the subsequent data bits would produce more bits of the first logic level than bits of the second logic level.

19. The method of claim 18, further comprising outputting the marker bit in unencoded form.

20. The method of claim 18, further comprising generating an additional signal indicating that the subsequent data bits are inverted, if inverting the subsequent data bits of the input set would produce more data bits of a second logic level than data bits of the first logic level.

21. The method of claim 18, wherein the search step includes searching the input set in an order starting from a most significant data bit of the input set.

22. The method of claim 18, further comprising transmitting the output data set on an optical connection.

23. The method of claim 22, further comprising:
receiving the output data set at a receiver; and
decoding the output data set at the receiver to produce a decoded data set identical to the input set.

24. The method of claim 23 wherein the decoding step includes:
searching the output data set for the marker bit;
placing in the decoded data set, in unencoded form, any data bits of the output data set previous to the marker bit;
inverting any data bits of the encoded set subsequent to the marker bit if inverting the subsequent data bits of the output data set would produce more data bits of the first logic level than data bits of the second logic level; and
placing in the decoded data set the subsequent data bits of the output data set in unencoded form if inverting the subsequent data bits of the output data set would produce more bits of the second logic level than bits of the first logic level.

25. The method of claim 23 wherein the decoding step includes:
searching the output data set for the marker bit;
placing in the decoded data set, in unencoded form, any data bits of the output data set previous to the marker bit;

determining from an additional signal, received with the output set, whether the subsequent data bits were inverted;

re-inverting the subsequent data bits; and placing in the decoded data set the subsequent data bits in unencoded form if the additional signal indicates that the subsequent data bits were not inverted.

26. A method of producing a decoded data set from an encoded set of data bits, the method comprising:
searching the encoded set for a marker bit that is the first data bit of the encoded set having a first logic level;
placing in the decoded data set, in unencoded form, any data bits of the encoded set previous to the marker bit;
inverting any data bits of the encoded set subsequent to the marker bit if inverting the subsequent data bits of the encoded set would produce more data bits of the first logic level than data bits of a second logic level; and
placing in the decoded data set the subsequent data bits in unencoded form if inverting the subsequent data bits would produce more bits of the second logic level than bits of the first logic level.

27. The method of claim 26, further comprising placing the marker bit in the decoded data set without decoding the marker bit.

28. The method of claim 26, further comprising receiving an additional signal indicating that the subsequent data bits were inverted, wherein the inverting step is performed in response to the additional signal.

29. The method of claim 26, wherein the data bits previous to the marker bit are more significant data bits of the encoded set than the marker bit.

30. The method of claim 26, further comprising receiving the encoded set via an optical connection from an encoder that produced the encoded set from an input data set identical to the decoded data set.

31. The computer-readable medium of claim 17 wherein the method further includes outputting the marker bit in unencoded form.

32. The computer-readable medium of claim 17 wherein the method further includes generating an additional signal indicating that the subsequent data bits are inverted, if inverting the subsequent data bits of the input set would produce more data bits of a second logic level than data bits of the first logic level.

* * * * *